(12) United States Patent
Shaver et al.

(10) Patent No.: US 9,021,050 B2
(45) Date of Patent: Apr. 28, 2015

(54) NETWORK SERVICE SYSTEM AND METHOD WITH OFF-HEAP CACHING

(75) Inventors: Matthew Shaver, Fremont, CA (US); Sachin Gupta, Fremont, CA (US)

(73) Assignee: YuMe, Inc., Redwood City, CA (US)

(*) Notice: Subject to any disclaimer, the term of this patent is extended or adjusted under 35 U.S.C. 154(b) by 69 days.

(21) Appl. No.: 13/601,118

(22) Filed: Aug. 31, 2012

(65) Prior Publication Data

US 2014/0067986 A1 Mar. 6, 2014

(51) Int. Cl.
*G06F 15/167* (2006.01)
*G06F 9/00* (2006.01)
*G06F 12/00* (2006.01)
*G06F 17/30* (2006.01)
*H04N 21/00* (2011.01)
*H04L 29/08* (2006.01)

(52) U.S. Cl.
CPC *G06F 17/30* (2013.01); *G06F 9/00* (2013.01); *G06F 12/00* (2013.01); *H04L 67/2842* (2013.01); *H04L 67/288* (2013.01); *H04N 21/00* (2013.01); *Y10S 707/9994* (2013.01)

(58) Field of Classification Search
None
See application file for complete search history.

(56) References Cited

U.S. PATENT DOCUMENTS

| | | | |
|---|---|---|---|
| 6,658,652 B1 | 12/2003 | Alexander, III et al. | |
| 6,728,960 B1 | 4/2004 | Loomans | |
| 6,941,410 B1 | 9/2005 | Traversat et al. | |
| 8,417,789 B1* | 4/2013 | Gopalan et al. | 709/216 |
| 2001/0037336 A1 | 11/2001 | Sauntry et al. | |
| 2005/0223018 A1 | 10/2005 | Forin et al. | |
| 2009/0182941 A1* | 7/2009 | Turk | 711/118 |
| 2010/0114997 A1 | 5/2010 | Micic et al. | |
| 2011/0295953 A1* | 12/2011 | Conlon et al. | 709/205 |
| 2012/0017165 A1* | 1/2012 | Gardner et al. | 715/771 |
| 2012/0102009 A1 | 4/2012 | Peterson et al. | |
| 2012/0222005 A1* | 8/2012 | Harris et al. | 717/120 |
| 2012/0290725 A1* | 11/2012 | Podila | 709/226 |
| 2013/0173806 A1* | 7/2013 | Newton et al. | 709/226 |

* cited by examiner

*Primary Examiner* — Nicholas Taylor
*Assistant Examiner* — Clayton R Williams
(74) *Attorney, Agent, or Firm* — TIPS Group

(57) ABSTRACT

A method for providing data over a network using an application server having off-heap caching includes receiving at an application server coupled to a network a request for requested data, using an key index stored on the application server to locate where the requested data is stored in oil-heap memory of the application server, retrieving the requested data from the off-heap memory of the application server, and resolving the request.

20 Claims, 8 Drawing Sheets

NETWORK SERVICE SYSTEM AND METHOD WITH OFF-HEAP CACHING

BACKGROUND

Electronic commerce, often known as "e-commerce", includes the buying and selling of products or services over electronic systems such as the Internet. The amount of trade conducted electronically has grown immensely with the widespread adoption of internet technology. One particularly explosive area of growth in e-commerce is in the field of advertising and, in particular, video advertising on the Internet.

Many network service systems supporting Internet functionality ("web network service systems"), including those involving the delivery of video over the Internet, are implemented with an object-oriented or pseudo object-oriented software platforms such as the Java® software platform, available from Oracle Corporation. One characteristic of Java is portability, which means that computer programs written in the Java language must run similarly on any hardware/operating-system platform. This is achieved by compiling the Java language code to an intermediate representation called Java bytecode, instead of directly to platform-specific machine code. Java bytecode instructions are analogous to machine code, but are intended to be interpreted by a virtual machine (VM) written specifically for the host hardware. Standardized libraries provide a generic way to access host-specific features such as graphics, threading, and networking.

One of the most critical performance issues for web service applications written in Java is garbage collection of data on a portion of virtual memory space known as "the heap." To keep the heap from filling up with obsolete objects a process known as "garbage collection" can be used to remove objects that are no longer being used. The garbage collection operation is associated with an "overhead", which is a period of time where other processes must be put on hold. Java objects which exist on the heap for a very short amount of time contribute very little to overhead during garbage collection. Objects which exist long enough on the heap to get moved into an "old generation space" have a high overhead during garbage collection.

Java uses an automatic garbage collector to manage memory in the object life-cycle. The programmer determines when objects are created, and the Java runtime is responsible for recovering the memory once objects are no longer in use. Once no references to an object remain, the unreachable memory becomes eligible to foe (reed automatically by the garbage collector. Something similar to a memory leak may still occur if a programmer's code holds a reference to an object that is no longer needed, typically when objects that are no longer needed are stored in containers that are still in use. If methods for a nonexistent object are called, a "null pointer exception" is thrown.

Java contains multiple types of garbage collectors. A common garbage collection is known alternatively as the "Concurrent Mark Sweep Collector" and the "CMS Garbage Collector." However, there are also several other garbage collectors that can be used to manage Java heap memory.

One of the ideas behind Java's automatic memory management model is that programmers can be spared the burden of having to perform manual memory management. Unfortunately, with Java, garbage collection may happen at any time. Ideally, it will occur when a program is idle. However, it is guaranteed to be triggered if there is insufficient free memory on the heap to allocate a new object, which can cause a program to stall momentarily. Explicit memory management is not possible in Java.

One of the most critical performance issues for web service applications written in Java, such as a video delivery system, is garbage collection of data on the heap. Java objects which exist for a very short amount of time have almost no overhead during garbage collection. But objects which exist long enough to get moved into the old generation space have a high overhead during garbage collection. Since garbage collection is automatic, critical application programs may be put on hold, preventing the timely performance of their functions.

For example, in an Internet-based advertising system that delivers video advertising, an advertisement ("ad") serving system might be required within 10 to 20 millisecond decision window such that all of the data needed to make the decision must be cached within the virtual memory of the application process. If garbage collection is initiated on the heap memory, the application program will go on hold, and the decision window will be lost.

These and other limitations of the prior art will become apparent to those of skill in the art upon a reading of the following descriptions and a study of the several figures of the drawing.

SUMMARY

In an embodiment, set forth by way of example and not limitation, a network service system with off-heap caching includes a plurality of application servers, a plurality of cache servers, and a local area network (LAN) router coupled the application servers to the cache servers. The plurality of application servers each run an application server process (ASP) having an ASP virtual memory-space with ASP heap memory and ASP off-heap memory. The plurality of cache servers each run a cache server process (CSP) having CSP indices and a cache constructor process (CCP) which is in communication with the CSP process, the CCP process having a CCP virtual memory space with CCP heap memory and CCP off-heap memory, the CSP process providing access to copies of CCP buffers stored in the CCP off-heap memory and to the CSP indices. The local area network (LAN) router coupling the plurality of application servers to the plurality of cache servers such that an ASP process can store the copies of the CCP buffers in the ASP off-heap memory and can use the key index to access the ASP buffers.

In an embodiment, set forth by way of example and not limitation, a method for providing data over a network using an application server having off-heap caching includes: receiving at an application server coupled to a network a request for requested data; using an key index stored on the application server to locate where the requested data is stored in off-heap memory of the application server; retrieving the requested data from the off-heap memory of the application server; and resolving the request.

In an embodiment, set forth by way of example and not limitation, a method for providing a network service system with off-heap caching includes: (a) providing a plurality of application servers each running an application server process (ASP) having an ASF virtual memory space with ASP heap memory and ASP off-heap memory; (b) providing a plurality of cache servers each running a cache server process (CSP) having CSP indices and a cache constructor process (CCP) which is in communication with the CSP process, the CCP process having a CCP virtual memory space with CCP heap memory and CCP off-heap memory, the CSP process providing access to copies of CCP buffers stored in the CCP off-heap memory and to the CSP indices; and (c) providing a local area network (LAN) router coupling the plurality of application servers to the plurality of cache servers such that an ASP process can store copies of the CCP buffers in the ASP off-heap memory and can use the key index to access the ASP buffers.

An advantage of certain example embodiments is that there is a reduced need for garbage collection due to the use of off-heap storage, which reduces system overhead and interruptions to ASP services. These and other advantages, embodiments and features will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, not limit, concepts disclosed herein. The drawings include the following figures:

FIG. 4A helps illustrate the example cache constructor process (CCP) setup method of FIG. 4;

DETAILED DESCRIPTION OF EXAMPLE EMBODIMENTS

Figure 1:
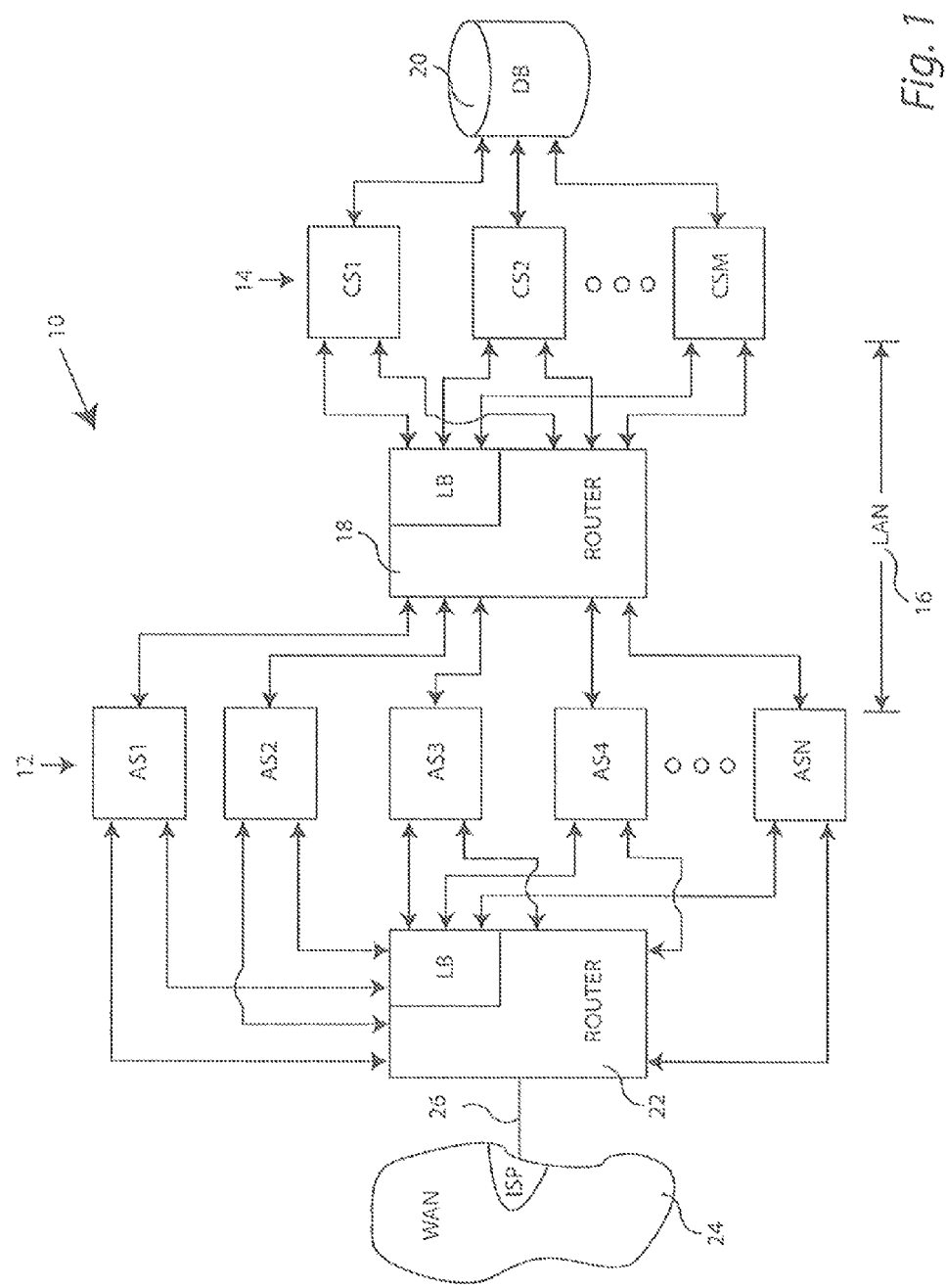
FIG. 1 is a block diagram of an example network service system with off-heap caching.

FIG. 1 is a block diagram of an example network service system 10 with off-heap caching. The example network service system 10 (which is sometime referred to as "a data center") includes a plurality of application servers 12 and a plurality of cache servers 14 which comprise a local area network (LAN) 16 including a LAN router 18. The example network service system 10 also includes a database server 20 coupled to the plurality of cache servers 14 and a wide area network (WAN) router 22 coupled to the plurality of application servers 12.

The plurality of application servers 12 include, in this non-limiting example, N application servers AS1, AS2, AS3, AS4, . . . ASN. The plurality of cache servers 14 include, in this non-limiting example, M cache servers CS1, CS2, . . . CSM. As is well known to those of skill in the art, servers such as application servers 12 and cache servers 14 are generally microprocessor-based computer systems designed for network use.

LAN router 18 preferably includes a load balancer (LB) to enhance the efficiency of the LAN 16. In this example, LAN router 18 couples the plurality of application servers 12 to the plurality of cache servers 18 such that a particular application server can become associated with a particular cache server. If, for example, application server AS2 is not yet associated with one of the plurality of cache servers 14, the load balancer LB of router 18 can assign one of the plurality of cache servers 14 based upon load balancing criteria well known to those of skill in the art. For example, AS2 may be assigned cache server CS1 to serve as its cache server. Once the relationship is established, AS2 and CS1 can communicate directly through the router 18.

WAN router 22 also preferably includes a bad balancer (LB) to enhance the efficiency of the communication between the network service system 10 and the WAN 24. In this example, the WAN router 22 is coupled to WAN 24 by a connection 26 to an Internet Service Provider (ISP) of the WAN 24 and is also couple to each of the plurality of application servers 12. When a request for data from a new requestor is received over connection 26, the load balancer LB of router 22 can assign one of the plurality of application servers 12 to handle the request based upon load balancing criteria well known to those of skill in the art. For example, the new requestor (e.g. a computer or mobile device communicating via the Internet) can be assigned to application server AS4. Once the relationship is established, the new requestor and communicate directly with application server AS4 through router 22.

Figure 2:
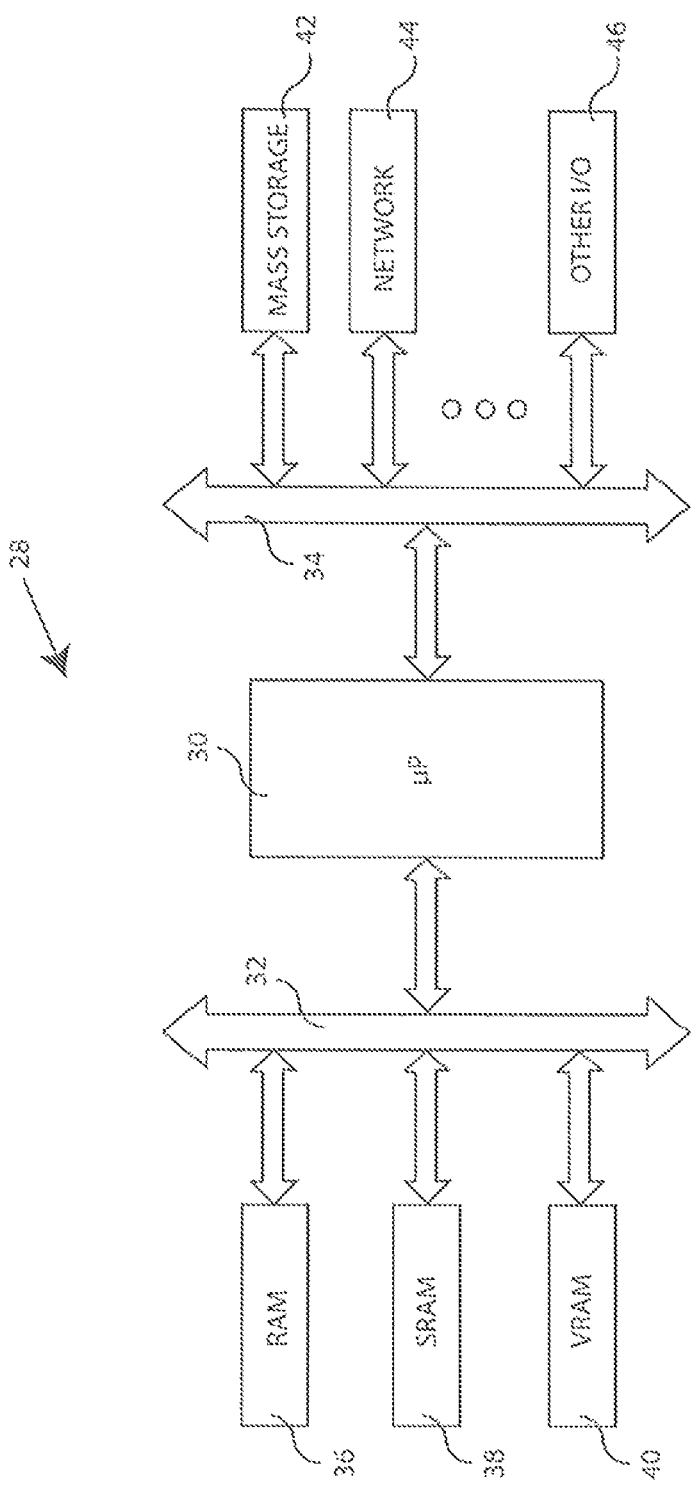
FIG. 2 is a block diagram of an example hardware configuration for servers, computers and microprocessor controlled apparatus which may form a part of the example network service system of FIG. 1.

FIG. 2 is a simplified block diagram of a computer and/or server 28 suitable for use in system 10. By way of non-limiting example, computer 28 includes a microprocessor 30 coupled to a memory bus 32 and an input/output (I/O) bus 34. A number of memory and/or other high speed devices may be coupled to memory bus 32 such as the RAM 36, SRAM 38 and VRAM 40. Attached to the I/O bus 34 are various I/O devices such as mass storage 42, network interface 44 and other I/O 46. As will be appreciated by those of skill in the art, there are a number of non-transient computer readable media available to the microprocessor 30 such as the RAM 36, SRAM 38, VRAM 40 and mass storage 42. The network interlace 44 and other I/O 46 also may include computer readable media such as registers, caches, buffers, etc. Mass storage 42 can be of various types including hard disk drives, optical drives and flash drives, to name a few.

Figure 3:
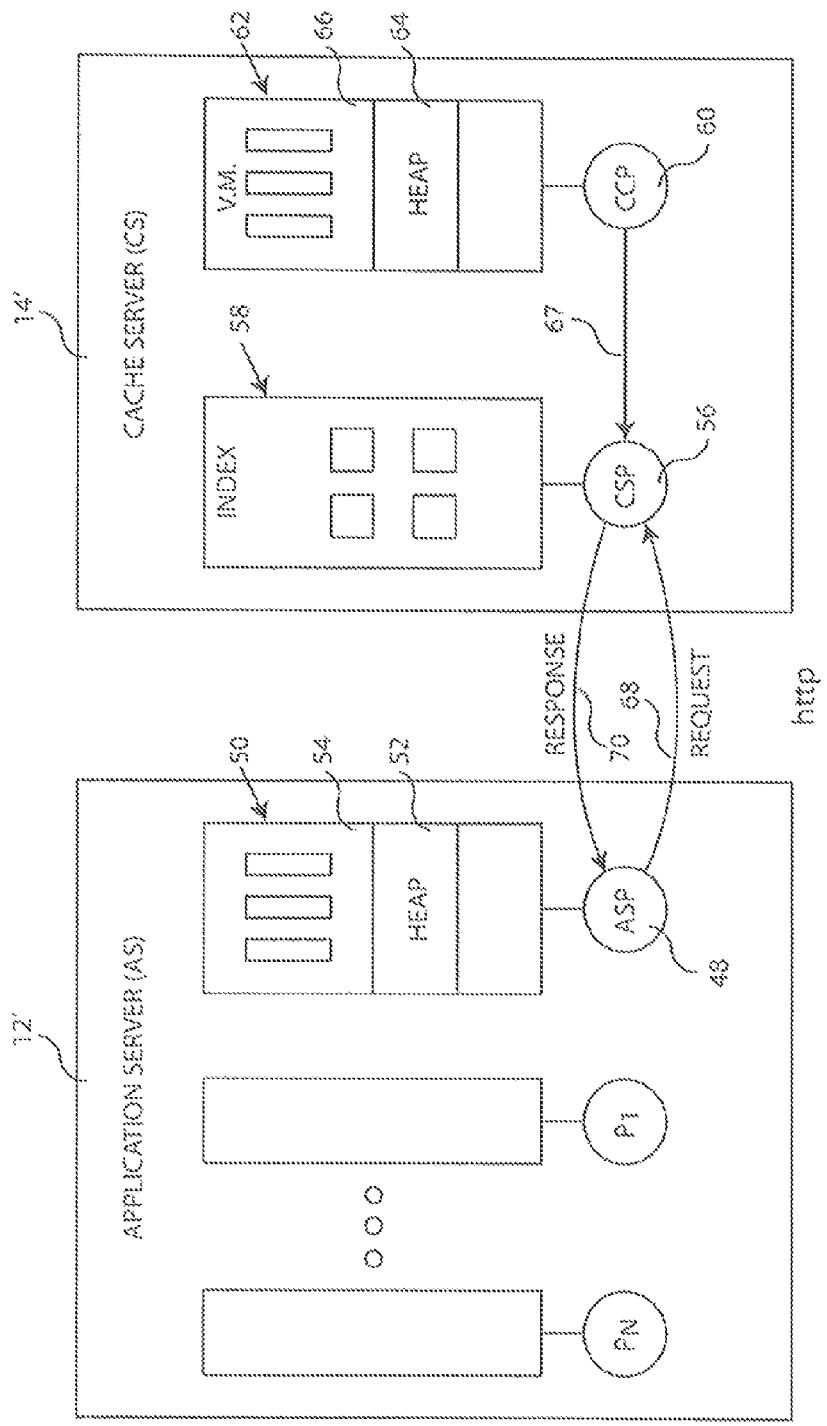
FIG. 3 illustrates certain example interactions between an application server (AS) and a cache server (CS) of the network service system of FIG. 1.

FIG. 3 illustrates certain example transactions between an application server (AS) 12' of the plurality of application servers 12 and a cache server (CS) 14' of the plurality of cache servers 14. As will be appreciated by those of skill in the art, application server 12' can run a number of concurrent processes and threads. By way of non-limiting example, application server 12 is shown to be running processes P1 . . . PN as well as an application server process (ASP) 48. Associated with each of these processes is an allocated amount of virtual memory space. For example, ASP 48 is associated with a virtual memory space 50 including heap memory 52 and off-heap memory 54.

As will be appreciated by those of skill in the art, virtual memory space is typically a contiguous range of virtual memory addresses which are mapped to physical memory that may or may not be contiguous. Java, for example, automatically allocates the range of addresses for the heap memory (which is subject to automatic garbage collection) for a process such as ASP 48 upon initialization. Portions of virtual memory space that are not on the heap ("off-heap memory") are not subject to automatic garbage collection by Java processes.

It should be noted that the present example is implemented using a Java software platform which generates heap memory that is subject to automatic garbage collection. Other examples can be implemented on other than a Java software platform which still may be subject to automatic garbage collection. It will therefore by understood that the term "heap memory" can be considered to mean "memory subject to automatic garbage collection" and "off-heap memory" can be considered to mean "memory that is not subject to automatic garbage collection" for such alternative examples.

As it will also be appreciated by those of skill in the art, cache server 14' can run a number of concurrent processes and threads. By way of non-limiting example, cache server 14' is shown to be running a cache server process (CSP) 56 having a virtual memory space 58 and a cache constructor process (CCP) 60 having a virtual memory space 62 with a heap memory 64 and an off-heap memory 66. The CSP 56 and CCP 60 communicate with each other as indicated at 67. The CSP 56 can be implemented with standard software cache servers, such as EHCache Cache Server provided by Terracotta, Inc. of San Francisco, Calif.

In this example, application server 12' and cache server 14 communicate using an HTTP protocol. As will be appreciated by those of skill in the art, HTTP stands for "Hypertext Transfer Protocol" which is an application protocol for distributed, collaborative, hypermedia information systems. For example HTTP is the foundation for data communication for the World Wide Web (WWW) on the Internet. With the HTTP protocol, ASP 48 may send a request 68 to CSP 56 which can "resolve the request" and provide a response 70 to the ASP 48. The request can be sent by HTTP path, as will be appreciated by those of skill in the art. A separate HTTP path provides access various data structures, lists and data blocks. For example, an HTTP path through the load balancer of router 18 for the CSP index for the video cache may look something like:

http://loadbaladd/playlisteache/videocache/index

As used herein, a "buffer" is a segment of virtual memory that is receptive to blocks of data or "data blocks." Data blocks are typically associated with a particular data type, such as video data, audio data, etc. A buffer might be of insufficient size to accommodate a particular data block, in which case multiple buffers may be used to store the data block. A buffer may also include more than one data block, even of different types. By way of non-limiting example, various types of data can be stored within the blocks for a particular data structure, such as the key index. Also, by way of non-limiting example, the data blocks can be of the same size as the data buffers, although multiple data blocks and data buffers may be needed to store the data for a particular data structure.

Figure 4:
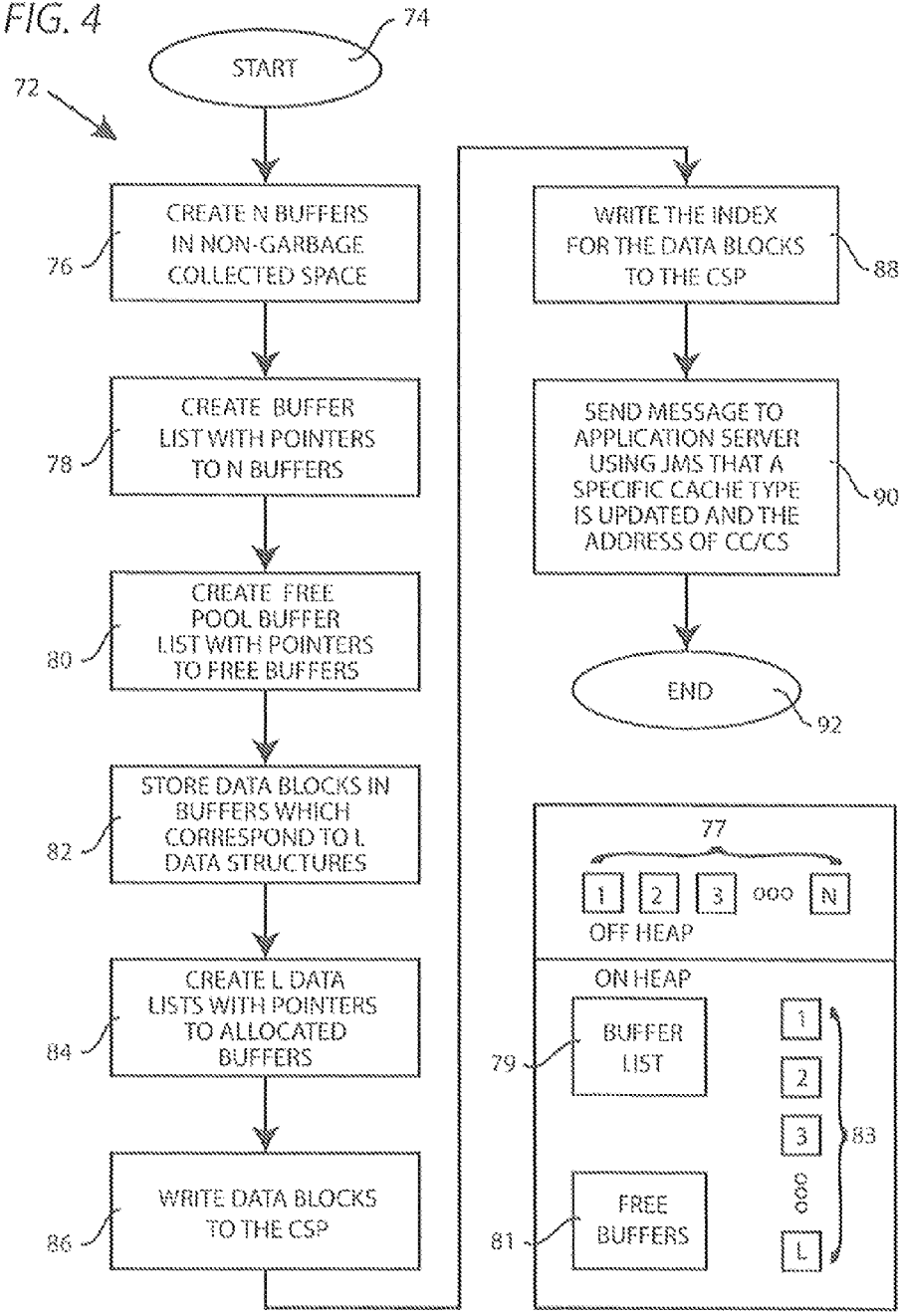
FIG. 4 is a flow diagram of an example cache constructor process (CCP) setup method.

FIG. 4 is a flow diagram of an example cache constructor process (CCP) setup method 72. FIG. 4A helps illustrate the example method 72 of FIG. 4A. In this example, method 72 starts at 74 and, in an operation 76, N buffers 77 are created in non-garbage collected (e.g. "off-heap") memory space. Next, in an operation 78, a buffer list 79 is created in garbage collected (e.g. "on heap") memory space with pointers to the N buffers 77. In an operation 80, a free pool buffer list 81 is created with pointers to free buffers of the N buffers 77 (which would be all of them on startup). Next, in an operation 82, data blocks are stored in buffers which correspond to "L" data structures 83. In an operation 84, L data lists are created with pointers to the allocated buffers of the N buffers 77. An operation 86 writes data blocks to the cache server process (CSP) and an operation 88 writes the index for the data blocks to the CSP. Next, in an operation 90, a message is sent to an application server (using, for example, a JMS protocol) to alert the application server that the off-heap cache has changed and providing the address of the CSP and CCP. As will be appreciated by those of skill in the art, the JMS protocol refers to the "Java Message Service" protocol for sending message between two or more clients (e.g., computers, servers, etc.). The method 72 ends at 92.

Figure 5:
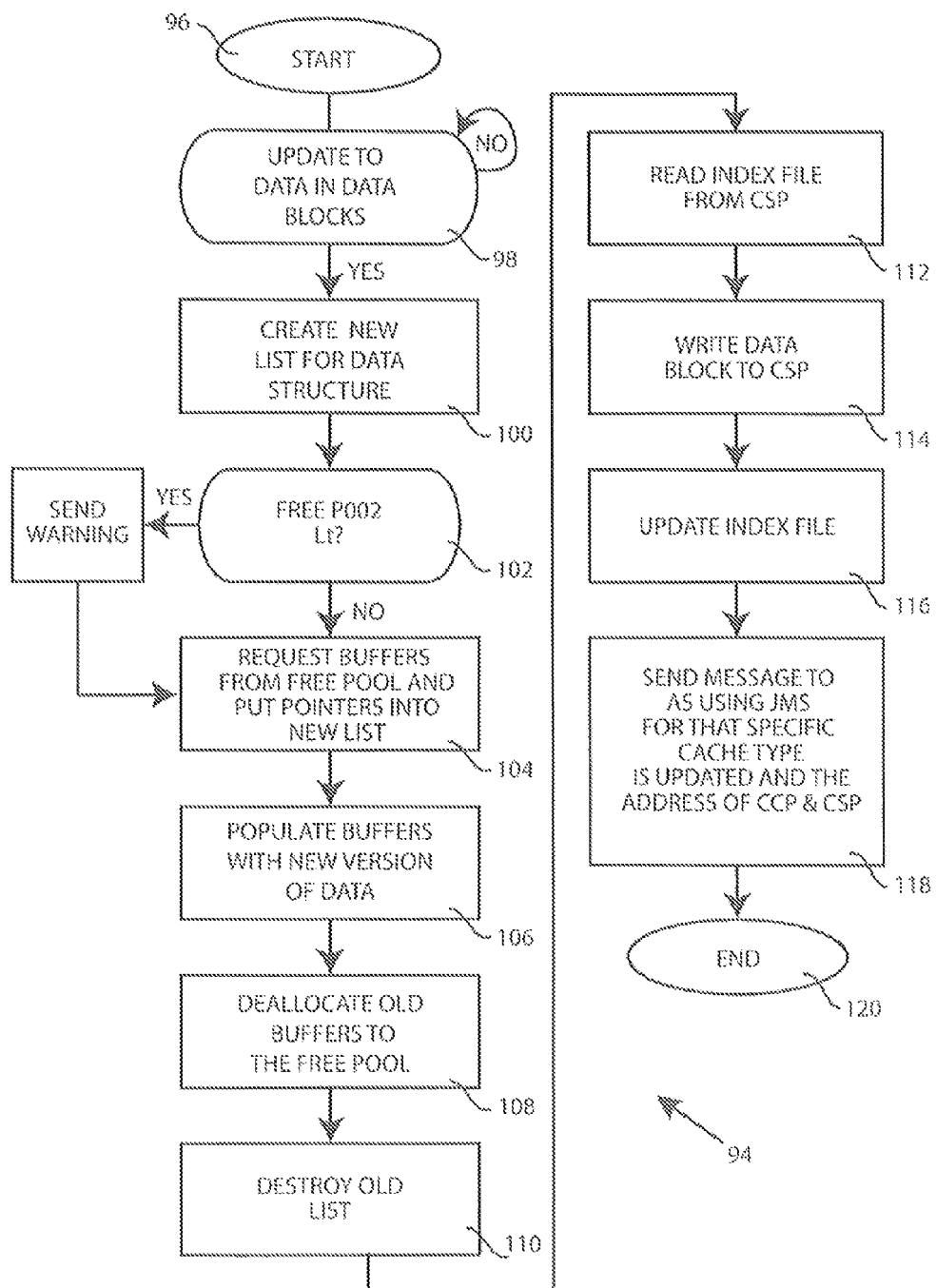
FIG. 5 is a flow diagram of an example process for updating a cache constructor process (CSP)

FIG. 5 is a flow diagram of an example process 94 for updating a cache constructor process (CSP). Process 94 starts at 96 and, in an operation 98, it is determined if there is an update to the data in the data blocks of the buffers stored in off heap memory. If so, an operation 100 creates a new list for the data structure. Optionally, in an operation 102, it can be determined if the number of buffers in the free pool has fallen below a threshold "t". For example, if the number of buffers N=1000, and if the threshold t=200, a message may be sent to an operator that the number of free buffers is getting low if the number of buffers in the free pool is less than 200. Next, in an operation 104, buffers are requested from the free pool and pointers to those buffers are put into the new list. In an operation 106, the buffers as populated with the new data blocks and the old buffers (with the obsolete date) is deallocated to the free buffer pool in an operation 108. The old key list is then destroyed in an operation 110, and the index file is read from the CSP in an operation 112. Next, in an operation 114, the data block is written to the CSP and, in an operation 116, the index file is updated. Finally, in an operation 118, a message is sent (e.g. using JMS) for that specific cache type that it has been updated and the address of the CSP and CCP are provided. The process 94 ends at 120.

It will be appreciated that the process 94 operates by creating a new set of data blocks and a new CSP index before destroying the old data blocks and old index. For example, if the old data is in a set of buffers "A", a new set of buffers "B" is provided with the new data blocks and a new CSP index is made to the data blocks in the B buffers. In this example embodiment, the writing of the "B" set of buffers and the overwriting of the old CSP index with the new CSP index causes a switch to the new data as an atomic operation. Once complete, the A buffers are returned to the free buffer pool and the old CSP index is allowed to be garbage collected.

Figure 6:
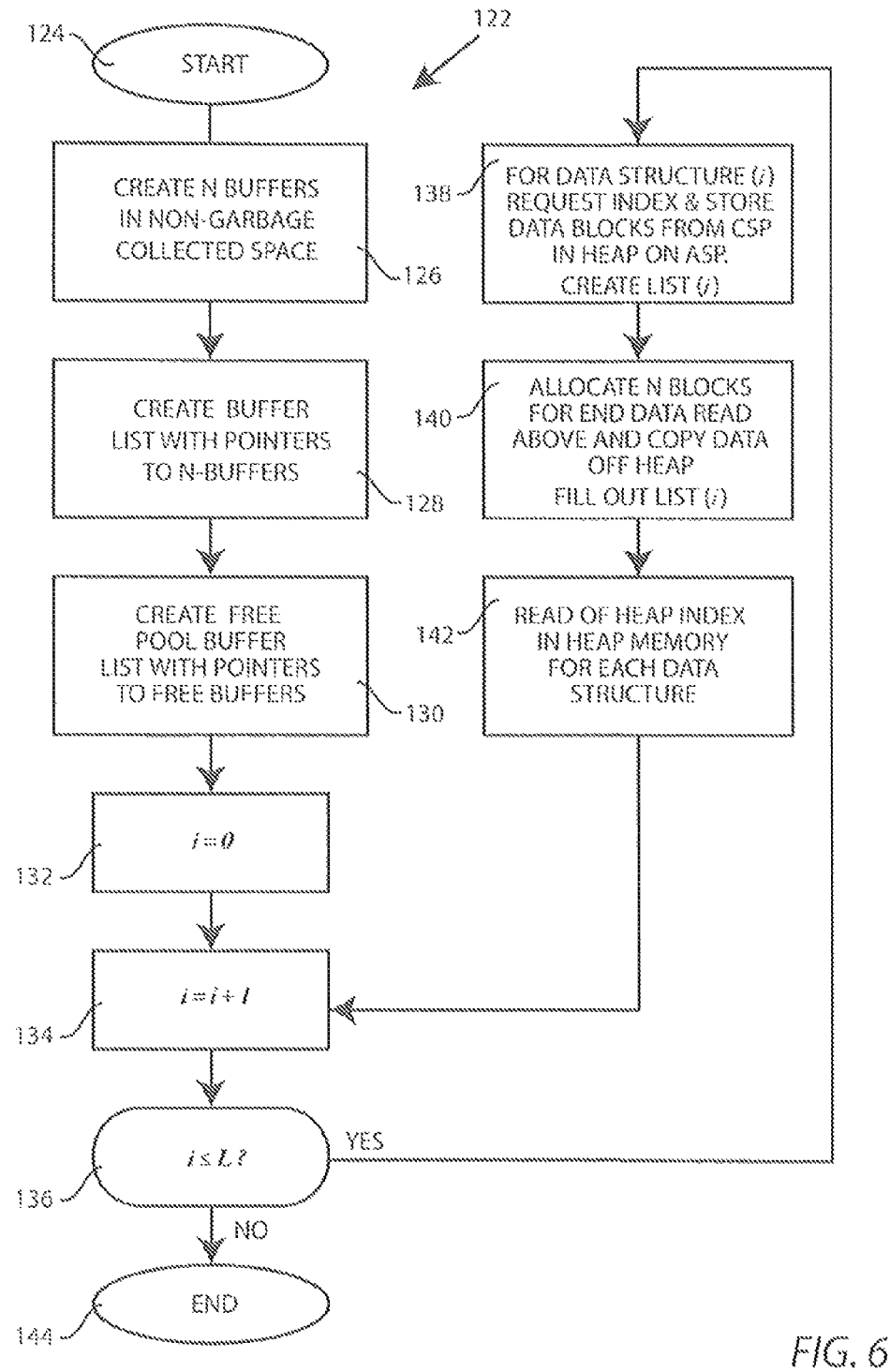
FIG. 6 is a flow diagram of an example process for starting-up the application servers.

FIG. 6 is a flow diagram of an example process 122 for starting-up the application servers 12. Preferably, the application servers 12 are not started up until after the cache server 14 have been started up. Process 122 starts at 124 and, in an operation 126, N buffers are created in non-garbage collected (e.g. heap memory) space. Next, in an operation 128, a buffer list is created with pointers to N buffers and, in an operation 130, a free pool buffer list is created with pointers to free buffers (which should be all of them on start-up). Next, in an operation 132 a counter "i" is initialized and, in an operation 134, the counter i is incremented by one. A decision operation 136 determines if the counter i is less than or equal to "L", the number of data types. If so, an operation 138 requests the index and stores data blocks from the CSP into the heap memory of the ASP for each data structure(i) as well as creating a list(i) for the data structure(i). For example, one type of data structure is a video data structure. Next, in an operation 140, N blocks are allocated for the N data types that were read by operation 138 and data is copied from the heap to fill out the list(i) for the data structure (i). Finally, the heap index is read off of heap memory for each data structure in an operation 142. The loop comprising operation 138, 140 and 142 is repeated L times, after which the process 122 ends at 144.

Figure 7:
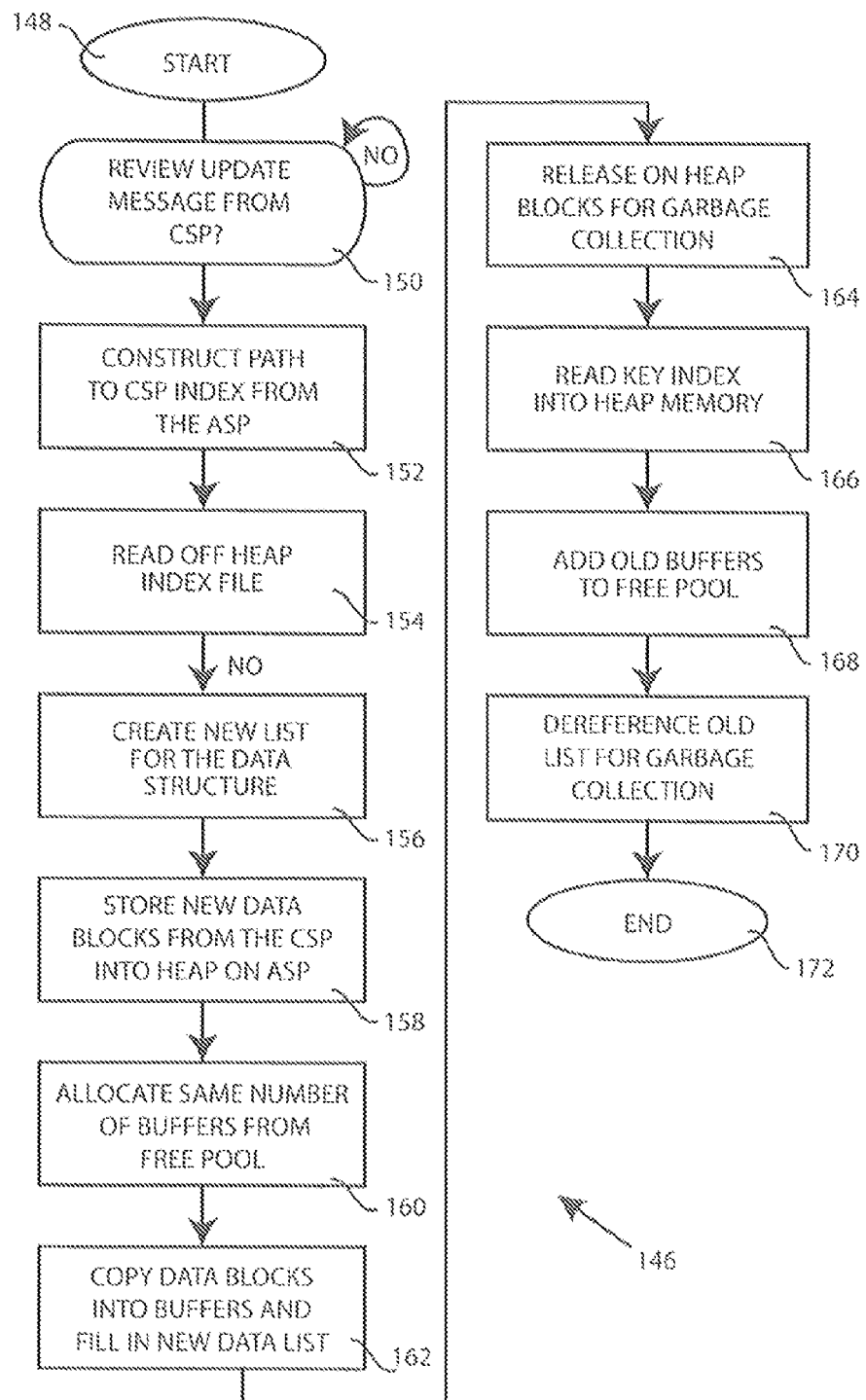
FIG. 7 is a flow diagram of an example process for updating the application server process (ASP)

FIG. 7 is a flow diagram of an example process 146 for updating the application server processes (ASP). The process 146 starts at 148 and, in a decision operation 150, it is determined whether an update has been received from the CSP. If so, an operation 152 constructs a data path to the CSP index from the ASP and the CSP index is read in an operation 154.

Next, in an operation 156, a new list is created for the data structure and, in an operation 158, new data blocks are stored from the CSP into the heap memory of the ASP. Operation 160 allocated the same number of buffers from the free buffer pool and operation 162 copies data blocks into the buffers and fills out the new data list. Next, in an operation 164, on-heap blocks are released for garbage collection and, in an operation 166, the key index is read into heap memory. Old buffers are returned to the free pool in an operation 168 and the old list Is de-referenced so that it is subject to garbage collection in operation 170. The process 146 ends at 172.

Figure 8:
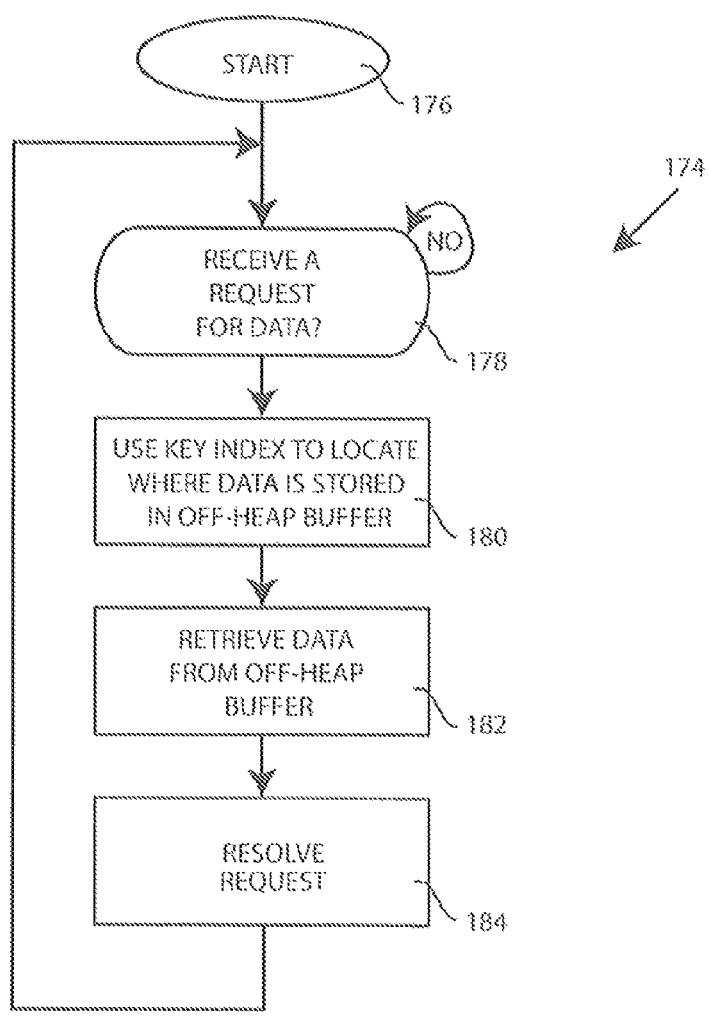
FIG. 8 is a flow diagram of an example application server process (ASP).

FIG. 8 is a flow diagram of an example process 174 for the application server process (ASP). Process 174 starts at 176 and, in a decision operation 178, it is determined if a request for data has been received. If so, an operation 180 uses the key index to locate where data is stored in the off-heap buffers (e.g. using a key provided by the request). Next, in an operation 182, data is retrieved from the off-heap buffer and, in an operation 184, the request is resolved. In the case of a TCP/IP request, this usually results in a response including the requested data.

It should be noted that in some of the examples as set forth herein, the key index resides in heap memory where it is subject to garbage collection. However, the overhead associated with this structure is far less than if the data blocks were also residing in heap memory. In other embodiments, the key index resides in off-heap memory. In such embodiments, the HTTP request for the key index that resides in heap memory is redirected to an oil-heap process (such as one implemented in the C programming language) implements the key index in off-heap memory.

Although various embodiments have been described using specific terms and devices, such description is for illustrative purposes only. The words used are words of description rather than of limitation. It is to be understood that changes and variations may be made by those of ordinary skill in the art without departing from the spirit or the scope of any embodiments described herein. In addition, it should be understood that aspects of various other embodiments may be interchanged either in whole or in part. It is therefore intended that the claims herein and hereafter presented be interpreted in accordance with their true spirit and scope and without limitation or estoppel.

What is claimed is:

1. A network service system with off-heap caching comprising:
   a plurality of application servers, each of said plurality of application servers running an application server process (ASP) having an ASP virtual memory space with ASP heap memory and ASP off-heap memory and having a key index stored in said ASP heap memory or said ASP off-heap memory of said each of said plurality of application servers, wherein an ASP process uses said key index of said each of said plurality of application servers to locate where data is stored in said ASP off-heap memory of said each of said plurality of application servers;
   a plurality of cache servers, each of said plurality of cache servers running a cache server process (CSP) having CSP indices and a cache constructor process (CCP) which is in communication with said CSP process on said each of said plurality of cache servers, said CCP process on said each of said plurality of cache servers having a CCP virtual memory space with CCP heap memory and CCP off-heap memory, said CSP process on said each of said plurality of cache servers providing access to data in CCP buffers stored in said CCP off-heap memory of said each of said plurality of cache servers and to said CSP indices of said CSP process on said each of said plurality of cache servers; and
   a local area network (LAN) router coupling said plurality of application servers to said plurality of cache servers such that said ASP process on said each of said plurality of application servers can access data in said CCP buffers and store copies of said data accessed in said CCP buffers into said ASP off-heap memory of said each of said plurality of application servers and can use said key index of said each of said plurality of application servers to access said copies of data stored from said CCP buffers into said ASP off-heap memory of said each of said plurality of application servers.

2. A network service system with off-heap caching as recited in claim 1 wherein said LAN router includes a load balancer to provide an initial introduction between an application server of said plurality of application servers and a cache server of said plurality of cache servers.

3. A network service system with off-heap caching as recited in claim 2 further comprising a database server coupled to said plurality of cache servers which can provide data to be stored in said CCP off-heap memory of said each of said plurality of cache servers.

4. A network service system with off-heap caching as recited in claim 3 further comprising a wide area network (WAN) router coupling said plurality of application servers to a WAN.

5. A network service system with off-heap caching as recited in claim 4 wherein said WAN router includes a load balancer to provide an initial introduction to an application server of said plurality of application servers.

6. A network service system with off-heap caching as recited in claim 5 wherein said WAN operates with an HTTP protocol.

7. A network service system with off-heap caching as recited in claim 6 wherein said WAN is the Internet.

8. A network service system with off-heap caching as recited in claim 7 wherein said LAN operates with an HTTP protocol.

9. A network service system with off-heap caching as recited in claim 8 wherein said ASP on said each of said plurality of application servers and said CSP on said each of said plurality of cache servers communicate with a request and a response.

10. A network service system with off-heap caching as recited in claim 9 wherein said key index of said each of said plurality of application servers is stored in said ASP heap memory.

11. A method for providing data over a network using an application server having off-heap caching comprising:
   providing at least one cache server running a cache server process (CSP) having CSP indices and a cache constructor process (CCP) which is in communication with the CSP process, the CCP process having a CCP virtual memory space with CCP heap memory and CCP off-heap memory;
   coupling an application server to said at least one cache server for accessing data in CCP buffers stored in said CCP off-heap memory and the CSP indices, said application server having a key index stored in heap memory or off-heap memory of said application server to locate where data is stored in said off-heap memory of said application server;
   accessing data in said CCP buffers and storing copies of said accessed data in said CCP buffers into said off-heap memory of said application server;

receiving at said application server coupled to a network a request for requested data;

using the key index stored on said application server to locate where said requested data is stored in said off-heap memory of said application server;

retrieving said requested data from said off-heap memory of said application server; and resolving the request.

12. A method for providing data over a network using an application server having off-heap caching as recited in claim 11 wherein said network is the Internet and wherein said request comprises a TCP/IP protocol request and wherein resolving said request comprises a TCP/IP protocol response.

13. A method for providing data over a network using an application server having off-heap caching as recited in claim 12 wherein said application server includes an application server process (ASP) having an ASP virtual memory space with a heap memory subject to automatic garbage collection.

14. A method for providing data over a network using an application server having off-heap caching as recited in claim 13 wherein said key index is stored in said heap memory.

15. A method for providing data over a network using an application server having off-heap caching as recited in claim 13 wherein said key index is stored in said off-heap memory.

16. A method for providing a network service system with off-heap caching comprising:

running an application server process (ASP) on each of a plurality of application servers, each of said plurality of application servers having an ASP virtual memory space with ASP heap memory and ASP off-heap memory and having a key index stored in said ASP heap memory or said ASP off-heap memory of said each of said plurality of application servers, wherein an ASP process uses said key index of said each of said plurality of application servers to locate where data is stored in said ASP off-heap memory of said each of said plurality of application servers;

running a cache server process (CSP) on each of a plurality of cache servers, each of said plurality of cache servers having CSP indices and a cache constructor process (CCP) which is in communication with said CSP process on said each of said plurality of cache servers, said CCP process on said each of said plurality of cache servers having a CCP virtual memory space with CCP heap memory and CCP off-heap memory, said CSP process on said each of said plurality of cache servers providing access to data in CCP buffers stored in said CCP off-heap memory of said each of said plurality of cache servers and to said CSP indices of said CSP process on said each of said plurality of cache servers;

coupling said plurality of application servers to said plurality of cache servers by a local area network (LAN) router such that said ASP process on said each of said plurality of application servers can access data and store copies of said data accessed in said CCP buffers into said ASP off-heap memory of said each of said plurality of application servers; and using said key index of said each of said plurality of application servers to access said copies of data stored from said CCP buffers into said ASP CCP off-heap memory of said each of said plurality of application servers.

17. A method for providing a network service system with off-heap caching as recited in claim 16 further comprising:

providing a database server that is coupled to said plurality of cache servers; and developing said CCP buffers stored in said CCP off-heap memory of said each of said plurality of cache servers using said database server.

18. A method for providing a network service system with off-heap caching as recited in claim 17 further comprising sending an update message to said plurality of application servers when there has been a change to said CCP buffers stored in said CCP off-heap memory of said each of said plurality of cache servers.

19. A method for providing a network service system with off-heap caching as recited in claim 18 wherein an ASP updates its off-heap memory to reflect the change to said CCP buffers stored in said CCP off-heap memory of said each of said plurality of cache servers.

20. A method for providing a network service system with off-heap caching as recited in claim 19 wherein said key index of said each of said plurality of application servers is updated to reflect the change to the CCP buffers stored in said CCP off-heap memory of said each of said plurality of cache servers.

\* \* \* \* \*

UNITED STATES PATENT AND TRADEMARK OFFICE
CERTIFICATE OF CORRECTION

| | | |
|---|---|---|
| PATENT NO. | : 9,021,050 B2 | Page 1 of 1 |
| APPLICATION NO. | : 13/601118 | |
| DATED | : April 28, 2015 | |
| INVENTOR(S) | : Matthew Shaver and Sachin Gupta | |

It is certified that error appears in the above-identified patent and that said Letters Patent is hereby corrected as shown below:

Title page, item (57) ABSTRACT, line 5, "oil-heap" should be --off-heap--

Signed and Sealed this
Eighth Day of September, 2015

Michelle K. Lee
*Director of the United States Patent and Trademark Office*